United States Patent
Ishikawa

(10) Patent No.: US 11,843,729 B2
(45) Date of Patent: Dec. 12, 2023

(54) INFORMATION PROCESSING APPARATUS, SYSTEM, CONTROL METHOD OF INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Akira Ishikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/162,986

(22) Filed: Feb. 1, 2023

(65) Prior Publication Data
US 2023/0254415 A1 Aug. 10, 2023

(30) Foreign Application Priority Data
Feb. 4, 2022 (JP) .................................. 2022-016554

(51) Int. Cl.
*G06F 3/12* (2006.01)
*H04N 1/00* (2006.01)
*G06N 3/08* (2023.01)

(52) U.S. Cl.
CPC ........... *H04N 1/00042* (2013.01); *G06N 3/08* (2013.01); *H04N 1/00087* (2013.01); *H04N 1/00244* (2013.01); *H04N 1/00323* (2013.01); *H04N 2201/0094* (2013.01)

(58) Field of Classification Search
CPC ........... H04N 1/00042; H04N 1/00087; H04N 1/00244; H04N 1/00323; H04N 2201/0094; G06N 3/08
See application file for complete search history.

(56) References Cited

U.S. PATENT DOCUMENTS

| 2020/0282719 A1* | 9/2020 | Katayama | ............... G06N 3/08 |
| 2021/0029255 A1* | 1/2021 | Kiriyama | ............... G06N 3/006 |
| 2021/0088985 A1* | 3/2021 | Sugai | ..................... G06N 3/08 |
| 2022/0159140 A1* | 5/2022 | Yamamoto | ........... G06F 3/1254 |
| 2022/0197572 A1* | 6/2022 | Kamada | ................ G06F 3/1257 |

FOREIGN PATENT DOCUMENTS

JP 2019022099 A 2/2019

* cited by examiner

*Primary Examiner* — Moustapha Diaby
(74) *Attorney, Agent, or Firm* — ROSSI, KIMMS & McDOWELL LLP

(57) ABSTRACT

An information processing apparatus according to an aspect of the present disclosure acquires feature information on communication performed by the information processing apparatus, estimates a usage environment of the information processing apparatus based on a trained model, which is generated through machine learning performed based on feature information on communication performed by a plurality of devices different from the information processing apparatus and setting information on usage environments set for the plurality of devices, and on the acquired feature information on the communication related to the information processing apparatus, and notifies the estimated usage environment of the information processing apparatus.

18 Claims, 13 Drawing Sheets

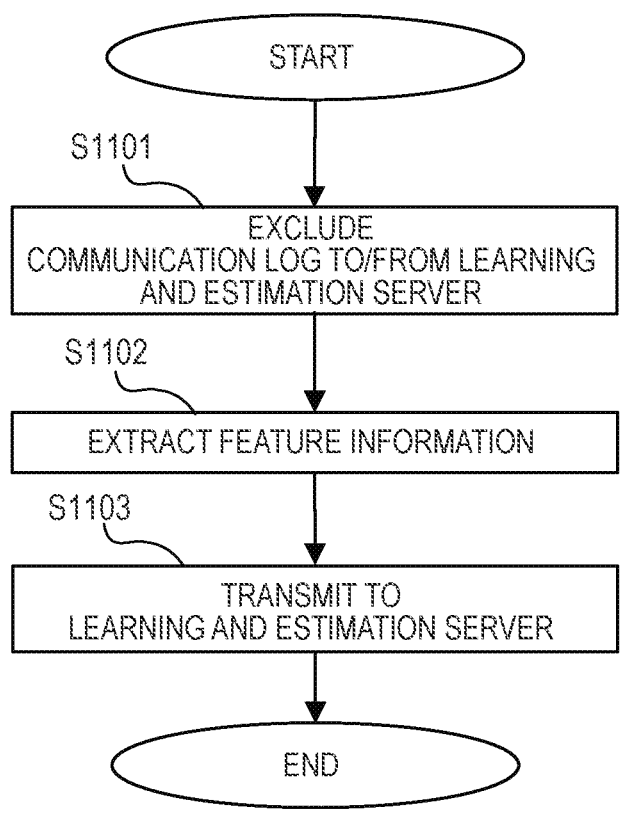

INFORMATION PROCESSING APPARATUS, SYSTEM, CONTROL METHOD OF INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a system, a control method of an information processing apparatus, and a non-transitory computer-readable storage medium.

Description of the Related Art

As security measures, it is required that various security-related functions of an information device have been appropriately set. In a case of an information device used in a single, fixed usage environment, if setting values fitted to the single usage environment are applied before shipping, the user may use the information device with an appropriate security measure being applied thereto without even thinking about security.

For example, in focusing on usage environments of a multi-function peripheral, the usage environments are diversified, such as not only use in an office environment but also use in remote working or use in a public space shared by an unspecified number of people. Since appropriate security settings differ in accordance with a usage environment, it is required to apply an appropriate setting fitted to the usage environment. In a case of an administrator of information devices who has expertise in security, measures to recognize that a setting change is required for each usage environment and change the setting in accordance with usage environment before use have been taken.

Japanese Patent Application Laid-Open No. 2019-22099 proposes a technique to manage a security policy set in advance and a feature of the operation status of a network in association with each other and, in response to detecting a change in the feature of the operation status of the network, assist an update of the security policy.

From a background of an increased number of personally used information devices and an increased need of remote working or the like, a case where a user having no expert knowledge about security manages information devices has increased. In recent years, information devices managed by individuals tend to take less sufficient security measures than information devices within a company network where security administrators take measures and thus have been more likely to be subjected to attacks from attackers.

SUMMARY OF THE INVENTION

The present invention intends to make it possible to suggest an estimated device usage environment and assist in configuring an appropriate setting related to a security measure.

An information processing apparatus according to the present invention includes: an acquisition unit that acquires feature information on communication performed by the information processing apparatus; an estimation unit that estimates a usage environment of the information processing apparatus based on a trained model and on the acquired feature information on the communication related to the information processing apparatus, the trained model being generated through machine learning performed based on feature information on communication performed by a plurality of devices, which differ from the information processing apparatus, and setting information on usage environments set for the plurality of devices; and a notification unit that notifies the estimated usage environment of the information processing apparatus.

Further features of the present invention will become apparent from the following description of exemplary embodiments with reference to the attached drawings.

BRIEF DESCRIPTION OF THE DRAWINGS

FIG. 11 is a flowchart illustrating an example of a data transmission process of the MFP.

DESCRIPTION OF THE EMBODIMENTS

Embodiments of the present invention will be described below with reference to the drawings.

First Embodiment

Figure 1:
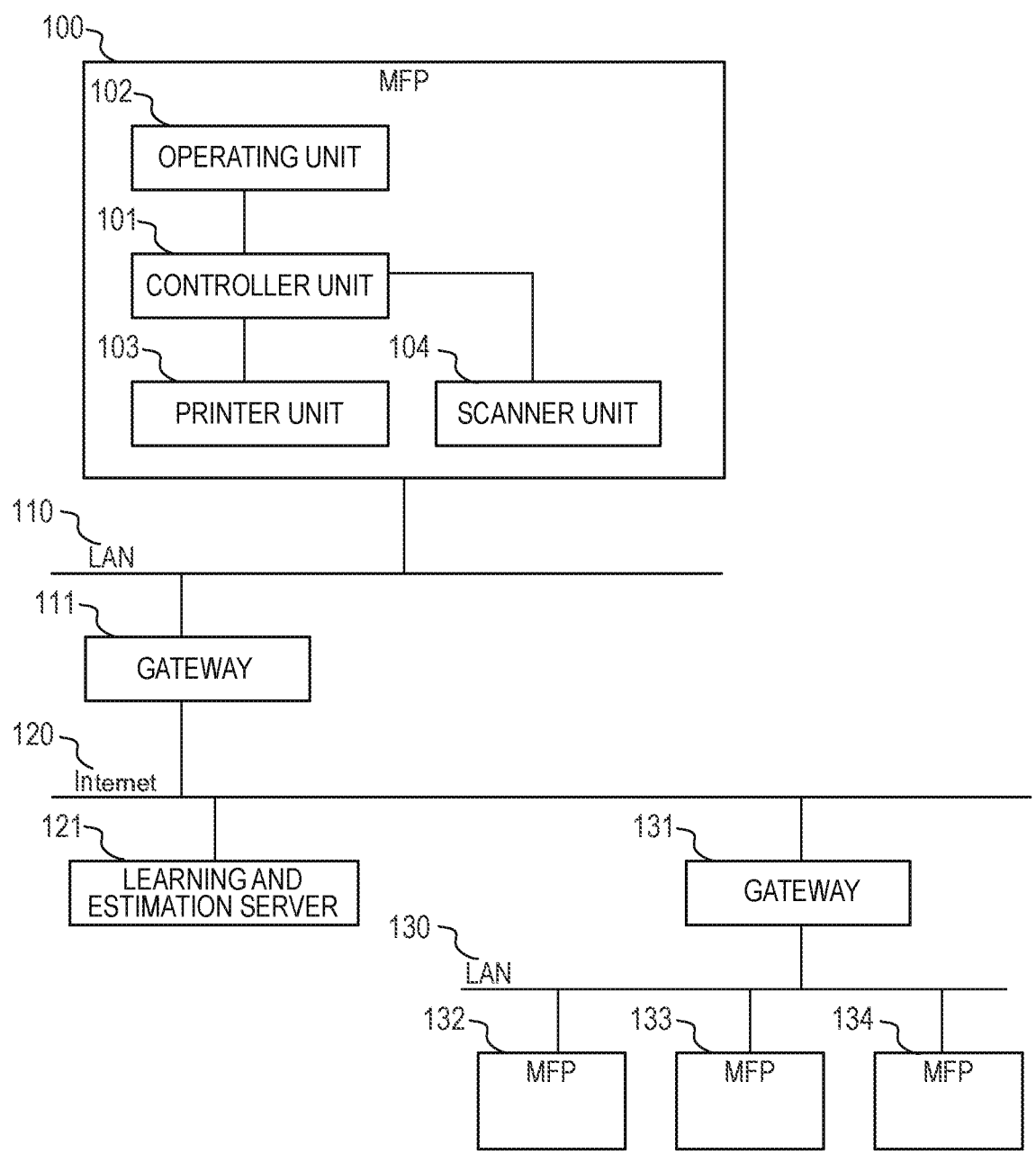
FIG. 1 is a diagram illustrating a connection form between MFPs and a learning and estimation server.

FIG. 1 is a diagram illustrating a connection form between multi-function peripherals (MFPs) 100, 132, 133, 134, gateways 111, 131, and a learning and estimation server 121 according to the present embodiment. The MFP 100 and the learning and estimation server 121 are connected via a local area network (LAN) 110, the gateway 111, and the Internet 120. Similarly, the MFPs 132, 133, 134 and the learning and estimation server 121 are connected via a LAN 130, the gateway 131, and the Internet 120.

In the following, description will be provided assuming that the MFP 100 is an MFP directly used by a user of interest (an estimation target MFP) in the present embodiment and the MFPs 132, 133, 134 are MFPs used somewhere by other users. The learning and estimation server 121 is a server that is managed by an MFP vender and can be shared and used by multiple users of the same vender. Respective MFPs 100, 132, 133, 134 are managed on a user basis. Although, as an example, the three MFPs 132, 133, 134 are illustrated as MFPs different from the MFP 100 directly used by the user of interest in FIG. 1 for the purpose of illustration, more MFPs are actually used and operated by a large number of users. Further, although, as an example, a single MFP 100 is illustrated as an MFP directly used by the user of interest, a plurality of MFPs may be used by the user of interest. Further, for example, the set of the LAN 110 and the gateway 111 and the set of the LAN 130 and the gateway 131 are separately used on a user basis.

The MFP 100 has an operating unit 102 used for input/output to and from a user, a printer unit 103 configured to output electronic data to a paper medium, and a scanner unit 104 configured to read a paper medium and convert the read content into electronic data. The operating unit 102, the printer unit 103, and the scanner unit 104 are connected to the controller unit 101 and implement the function as a multi-function peripheral under the control of the controller unit 101. Although depiction is omitted for simplified illustration in FIG. 1, the MFPs 132, 133, 134 also have the controller unit 101, the operating unit 102, the printer unit 103, and the scanner unit 104.

The gateway 111 is a network router that relays communication of the MFP 100 to and from the Internet 120. Similarly, the gateway 131 is a network router that relays communication of the MFPs 132, 133, 134 to and from the Internet 120. The learning and estimation server 121 collects information on the MFPs 100, 132, 133, 134 to learn a trend and performs an estimation process based on each request from the MFPs 100, 132, 133, 134.

Figure 2:
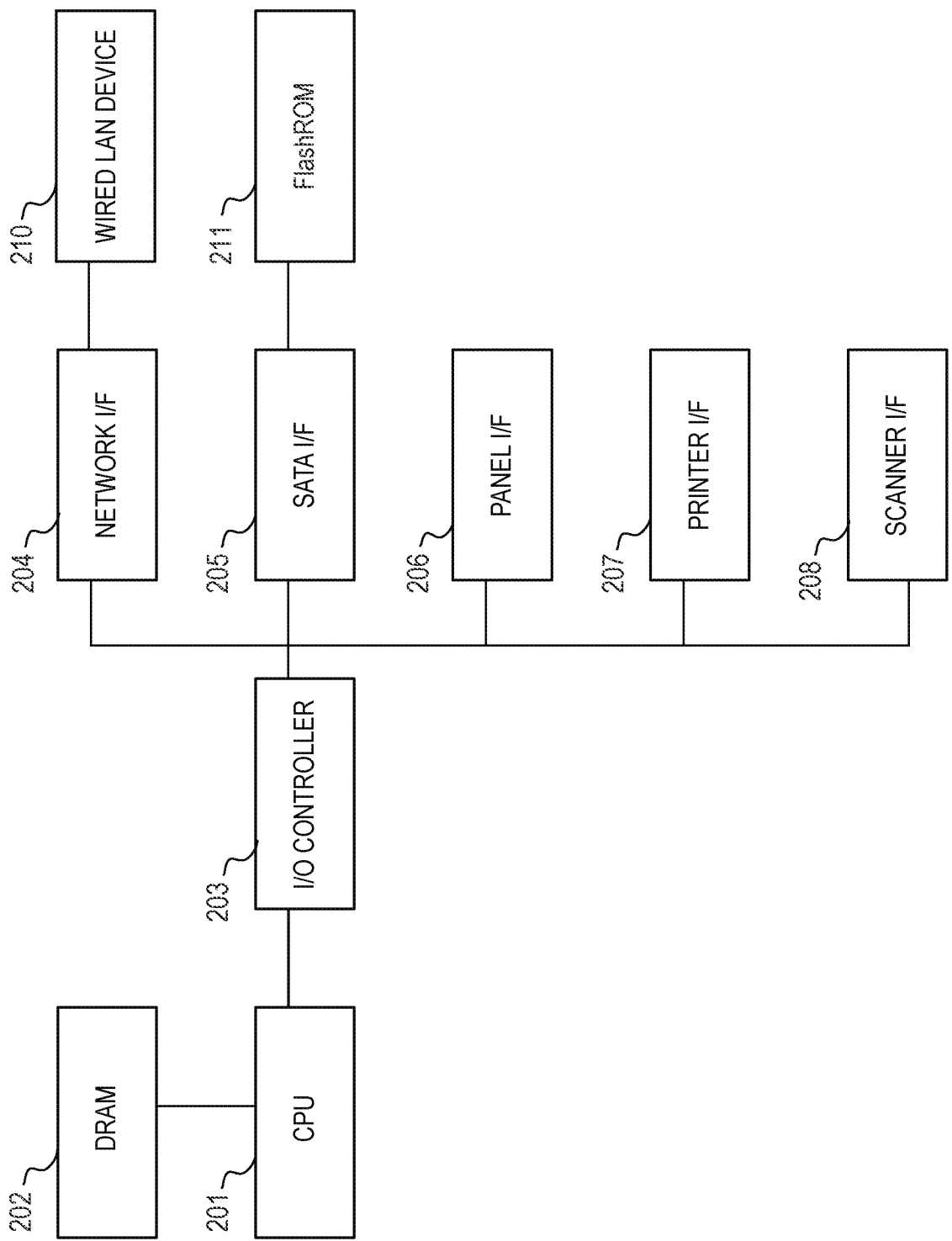
FIG. 2 is a diagram illustrating an example of a configuration of a controller unit of an MFP.

FIG. 2 is a block diagram illustrating an example of the configuration of the controller unit 101 of the MFP. A central processing unit (CPU) 201 performs the main calculation process inside the controller unit 101. The CPU 201 is connected to a dynamic random access memory (DRAM) 202 via a bus. The DRAM 202 is used by the CPU 201 as a work memory in which program data representing a calculation instruction or processing target data are arranged in a course of calculation of the CPU 201. The CPU 201 is connected to an I/O controller 203 via a bus. The I/O controller 203 performs input/output to and from various devices under the instruction from the CPU 201.

A Serial Advanced Technology Attachment (SATA) I/F 205 is connected to the I/O controller 203. A flash read only memory (ROM) 211 is connected to the SATA I/F 205. The CPU 201 uses the flash ROM 211 for storing a program and a document file for implementing the function of the MFP. A network I/F 204 is connected to the I/O controller 203. A wired LAN device 210 is connected to the network I/F 204. The CPU 201 implements communication over the LAN 110 by controlling the wired LAN device 210 via the network I/F 204.

A panel I/F 206 is connected to the I/O controller 203. The CPU 201 implements input/output for the user to and from the operating unit 102 via the panel I/F 206. A printer I/F 207 is connected to the I/O controller 203. The CPU 201 implements an output process of a paper medium using the printer unit 103 via the printer I/F 207. A scanner I/F 208 is connected to the I/O controller 203. The CPU 201 implements a reading process of a paper medium document using the scanner unit 104 via the scanner I/F 208.

For example, when a copy function is implemented, the CPU 201 loads program data into the DRAM 202 from the flash ROM 211 via the SATA I/F 205. The CPU 201 detects a copy instruction from a user provided to the operating unit 102 via the panel I/F 206 in accordance with the program loaded into the DRAM 202. In response to detecting a copy instruction, the CPU 201 receives a document as image data from the scanner unit 104 via the scanner I/F 208 and stores the received image data in the DRAM 202. The CPU 201 performs, on image data stored in the DRAM 202, a color conversion process or the like suitable for output. The CPU 201 transfers image data stored in the DRAM 202 to the printer unit 103 via the printer I/F 207 and performs an output process to a paper medium.

Figure 3:
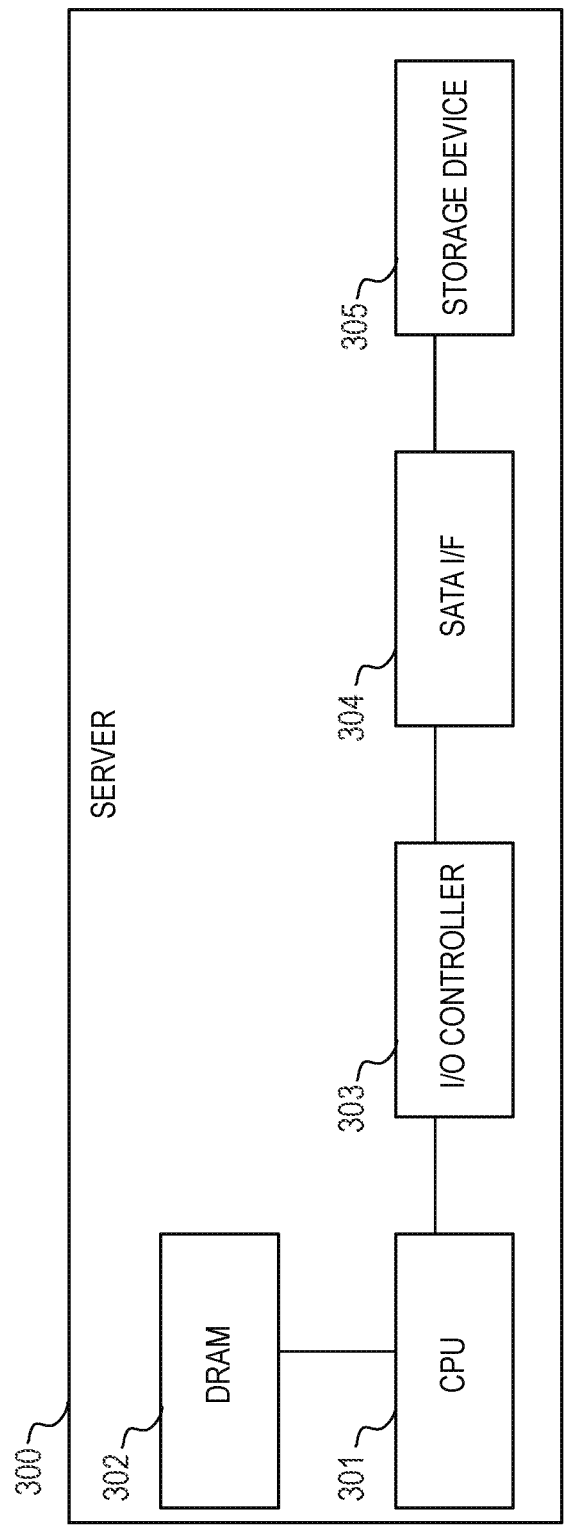
FIG. 3 is a diagram illustrating an example of a configuration of the learning and estimation server.

FIG. 3 is a block diagram illustrating an example of a configuration of a server 300 that implements the learning and estimation server 121. A CPU 301 performs a main calculation process in the server 300. The CPU 301 is connected to a DRAM 302 via a bus. The DRAM 302 is used by the CPU 301 as a work memory in which program data representing a calculation instruction or processing target data are arranged in a course of calculation of the CPU 301. The CPU 301 is connected to an I/O controller 303 via a bus. The I/O controller 303 performs input/output to and from various devices under the instruction from the CPU 301. A SATA I/F 304 is connected to the I/O controller 303. A storage device 305 is connected to the SATA I/F 304. The CPU 301 uses the storage device 305 for storing a program and a setting value for implementing various functions of the server. For example, the storage device 305 is a hard disk drive (HDD) or a solid state drive (SSD), or the like.

As discussed above, the hardware components such as the CPU 301, the DRAM 302, the storage device 305, and the like form a so-called computer. Although, in the present embodiment, a case where a single CPU 301 uses a single memory (the DRAM 302) to perform each process illustrated in flowcharts described later will be described as an example for the purpose of illustration, other forms may be employed. For example, it is also possible to cause a plurality of processors, RAMs, and storage devices to cooperate with each other to perform respective processes illustrated in the flowcharts described later. Further, a plurality of server computers may be used to perform respective processes. The server 300 can provide the function of the learning and estimation server to a plurality of different tenants by using a containerization or virtualization technique.

Figure 4:
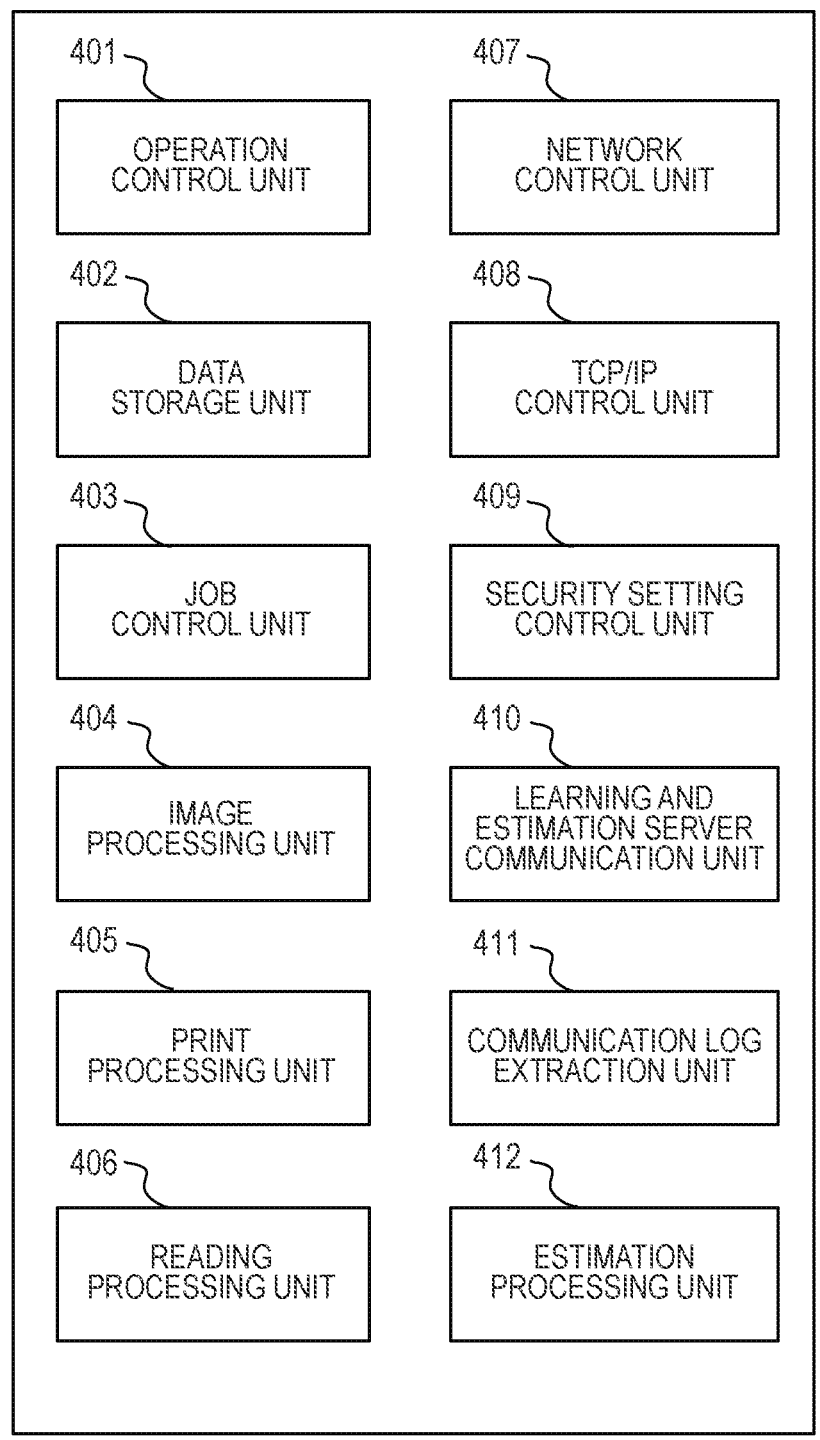
FIG. 4 is a diagram illustrating an example of a function configuration of the controller unit of the MFP.

FIG. 4 is a block diagram illustrating an example of a function configuration implemented by software executed in the controller unit 101 of an MFP. All the software executed by the controller unit 101 is executed after the CPU 201 loads a program stored in the flash ROM 211 into the DRAM 202.

An operation control unit 401 displays a window image for the user on the operating unit 102, detects a user operation, and performs a process associated with a window component such as a button displayed on the screen. A data storage unit 402 writes and reads data to and from the flash ROM 211 in response to a request from another control unit. For example, when the user intends to change some device setting, the operation control unit 401 detects a content input by the user to the operating unit 102, and the data storage unit 402 stores the detected content as a setting value in the flash ROM 211 in response to a request from the operation control unit 401.

A job control unit 403 controls job execution under an instruction from another control unit. The image processing unit 404 modifies image data into a form suitable for each use under an instruction from the job control unit 403. A print processing unit 405 prints an image on a paper medium via the printer I/F 207 under an instruction from the job control unit 403. A read processing unit 406 reads a document via the scanner I/F 208 under the instruction from the job control unit 403.

A network control unit 407 configures a network setting such as an IP address for a TCP/IP control unit 408 in accordance with a setting value stored in the data storage unit 402 when the system starts up or a setting change is detected. The TCP/IP control unit 408 transmits and receives network packets via the network I/F 204 under an instruction from another control unit.

A security setting control unit 409 performs control related to security settings of the MFP. The security setting control unit 409 can manage the correspondence between a usage environment such as an internal LAN, a home, a public space, or the like and a security-related setting item associated therewith and collectively configure associated security-related settings in response to the user designating the user environment. The security setting control unit 409 uses the data storage unit 402 for referencing and changing a setting value.

A learning and estimation server communication unit 410 uses the network control unit 407 and transfers information between the learning and estimation server 121 and the MFP 100. For example, the learning and estimation server communication unit 410 instructs the network control unit 407 to transmit information such as communication logs extracted by a communication log extraction unit 411 to the learning and estimation server 121. Further, for example, under the instruction from an estimation processing unit 412, the learning and estimation server communication unit 410 instructs the network control unit 407 to transmit a request for a usage environment estimation result to the learning and estimation server 121 and receive an estimation result from the learning and estimation server 121.

The communication log extraction unit 411 uses the network control unit 407 to extract a communication log related to transmission and reception of data performed by the MFP 100. For example, from pieces of information associated with a network packet, the communication log extraction unit 411 extracts IP addresses of a destination and a sender, a type of TCP/UDP, a port number, and IP header information. The content part of a packet called a payload is excluded because of the above extraction process performed by the communication log extraction unit 411.

The estimation processing unit 412 performs a usage environment estimation process in response to start of screen display or passage of a certain period. For example, as the estimation process, the estimation processing unit 412 acquires an estimation result (information on an estimated usage environment) by requesting a usage environment estimation result from the learning and estimation server 121.

Figure 5:
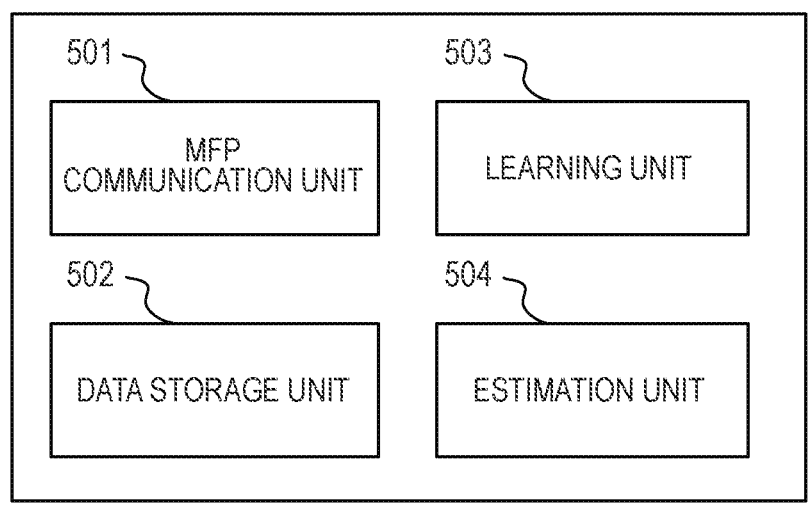
FIG. 5 is a diagram illustrating an example of a function configuration of the learning and estimation server.

FIG. 5 is a block diagram illustrating an example of a function configuration implemented by software executed by the learning and estimation server 121. All the software executed by the learning and estimation server 121 is executed after the CPU 301 loads a program stored in the storage device 305 into the DRAM 302.

An MFP communication unit 501 controls communication with an MFP communicatively connected thereto. The MFP communication unit 501 stores information such as communication logs (feature information) or setting values for usage environments (setting information) received from an MFP in a data storage unit 502 and accepts a request for an estimation result from an MFP and transmits an estimated result estimated by an estimation unit 504 to the MFP. The data storage unit 502 performs data storage and reading on distributed resources on a cloud in response to a request from another function unit.

A learning unit 503 generates a trend of communication logs for a usage environment as a trained model based on association between communication logs (feature information) stored in the data storage unit 502 and setting values for the usage environments (setting information). The generated trained model is held in the data storage unit 502. In response to a request for an estimation result received via the MFP communication unit 501, the estimation unit 504 estimates the usage environment of the MFP that has transmitted the request for an estimation result. The estimation unit 504 estimates the usage environment based on communication data on the MFP that has transmitted the request for an estimation result and the generated trained model that is a modeled trend of communication logs for the usage environment, both of which have been stored in the data storage unit 502.

Figure 6A:
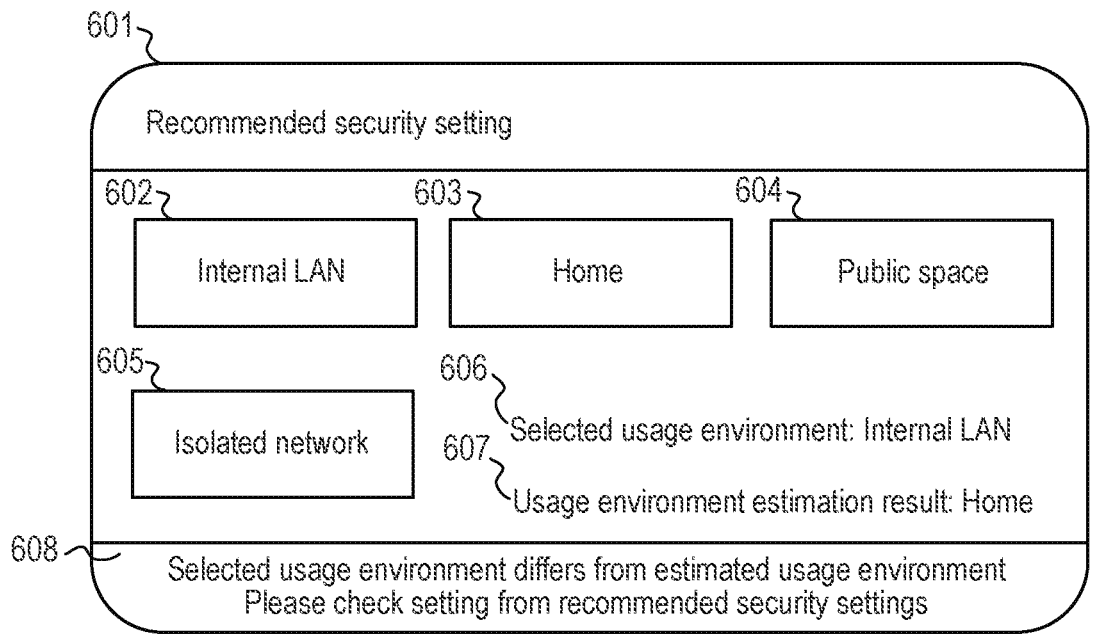
FIG. 6A is a diagram illustrating a window configuration related to a security setting.
Figure 6B:
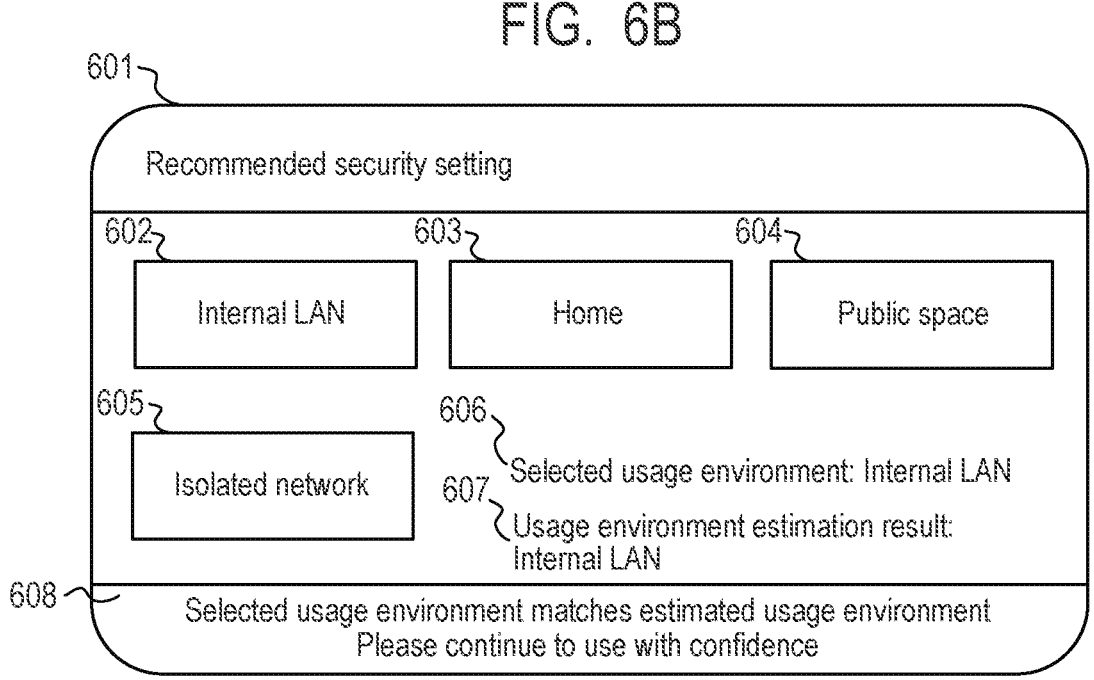
FIG. 6B is a diagram illustrating a window configuration related to a security setting.

FIG. 6A and FIG. 6B are diagrams illustrating a recommended security setting window 601 displayed on the operating unit 102. In FIG. 6A and FIG. 6B, a usage environment internal-LAN button 602 is a button used for collectively configuring a series of security settings determined as appropriate when the usage environment of a setting target MFP is an internal LAN. A usage environment home button 603 is a button used for collectively configuring a series of security settings determined as appropriate when the usage environment of a setting target MFP is a home. A usage environment public-space button 604 is a button used for collectively configuring a series of security settings determined as appropriate when the usage environment of a setting target MFP is a public space. An isolated network button 605 is a button used for collectively configuring a series of security settings determined as appropriate when the usage environment of a setting target MFP is an isolated network.

A usage environment display part 606 being selected indicates an MFP usage environment set by the button 602, 603, 604, or 605. Information on what is selected as a usage environment is stored in the data storage unit 402 together with date and time information indicating a timing that the corresponding button was pressed, that is, when it was pressed. A usage environment estimation result display part 607 indicates an MFP usage environment estimated from a trend of communication logs by the estimation process using the trained model. An information display part 608 is a display region that notifies the user of various information.

FIG. 6A illustrates an example of display when a usage environment selected by the button 602, 603, 604, or 605 differs from an estimated usage environment. In such a case, since the selection made by the user related to the security setting is likely to be inappropriate, a notification as illustrated in FIG. 6A is provided by using the information display part 608 to suggest the user to reconsider the setting through the recommended security setting window 601.

FIG. 6B illustrates an example of display when a usage environment selected by the button 602, 603, 604, or 605 matches an estimated usage environment. In such a case, since the selection made by the user related to the security setting is likely to be appropriate, a notification as illustrated in FIG. 6B is provided by using the information display part 608 to imply to the user that the MFP can be safely used.

Note that, although the case where the MFP usage environment may be any of four patterns of an internal LAN, a home, a public space, and an isolated network has been illustrated in the above example, the embodiment is not limited thereto. Another pattern may be provided as an MFP usage environment, or less than four patterns may be provided, and any button for security settings can be provided in accordance with the provided usage environment patterns.

Further, although an example in which MFP usage environments are classified by a usage scene such as remote working has been illustrated in the present embodiment, a form in which some classifications may be prepared simply as variation in terms of security strength such as security level 1, security level 2, and the like may be employed. In such a case, while learning and estimation for usage environments based on communication logs are performed on security strength, this is substantially the same as above, because the security strength is also associated with a usage scene.

Figure 7:
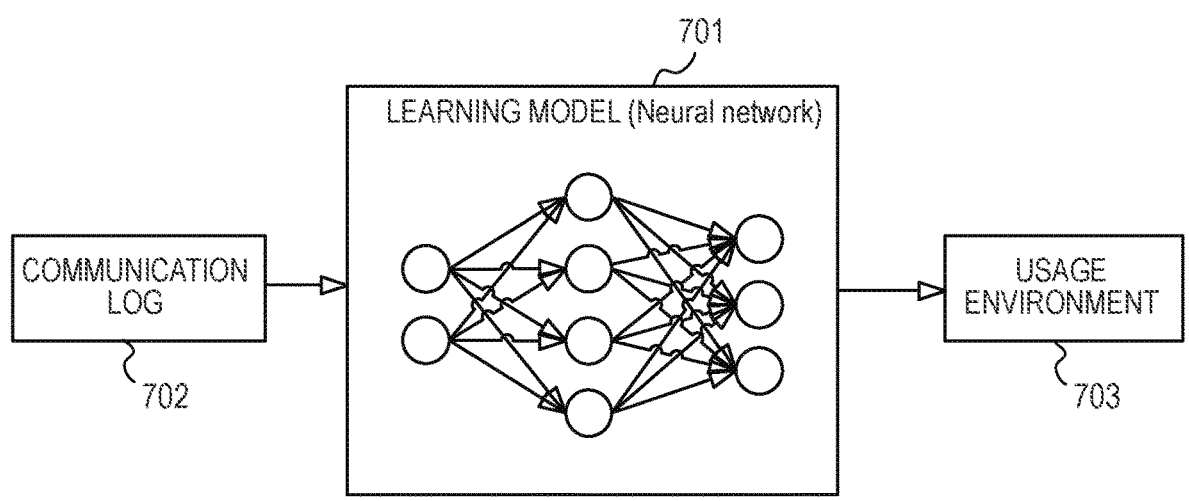
FIG. 7 is a diagram illustrating the input/output structure with a learning model.

FIG. 7 is a conceptual diagram illustrating the input/output structure with a learning model of the present embodiment. A learning model (trained model) 701 outputs a usage environment 703 from communication logs (feature information on communication) 702 as input. The usage environment 703 is formed of patterns illustrated in Table 1 in the example of the present embodiment.

TABLE 1

| Usage environment | Summary |
| --- | --- |
| Internal LAN | Typical office environment |
| Isolated network | Separated network where connection to the Internet is disabled |
| Home | Home network expecting remote working |
| Public space | Open space where an unspecified number of people come and go and share a network |

The usage environment "Internal LAN" represents a typical office environment, which assumes an environment where many people gather and also use Internet connection in order to use a cloud service. The number of information devices to be connected is the largest compared to other usage environments. In such an environment, in general, a managed firewall is provided at the boundary to the external network, and further, users who may use the environment are limited to only the employees. In such a case, the security measure taken on the usage environment side and the security measure taken on each terminal side are generally used in a well-balanced manner.

The usage environment "Isolated network" assumes an environment in which a network disconnected and separated from the Internet in terms of a network topology is used because an old type protocol is used therein or the like. The number of information devices to be connected is relatively smaller. In such a case, it is possible to relax the level of the security measure taken on the terminal side by taking a strong security measure on the usage environment side.

The usage environment "Home" represents a home network expecting a case of remote working or the like, which assumes an environment a small-scale LAN used in a home is directly used for business from the home. The number of information devices to be connected is the smallest. In such a case, it is required to take a security measure on the terminal side in a well-balanced manner assuming that the security measure taken on the usage environment side is less reliable.

The usage environment "Public space" assumes an open space environment where an unspecified number of people may come and go and can share a network. For example, a lounge of an airport, a coworking space available for guests, or the like correspond to this environment, which will be used under a less strict entry restriction. The number of information devices to be connected is relatively larger. In such a case, it is required to take a security measure even at the expense of functionality on the terminal side to some degrees basically without trusting a security measure taken by the usage environment side.

Further, the communication log 702 is formed of data illustrated in Table 2 in the example of the present embodiment.

TABLE 2

| Communication log attribute | Summary |
| --- | --- |
| Traffic volume | Proportional to the number of devices forming a network |
| Number of destination addresses | Proportional to the number of external services used by devices |
| Number of sender addresses | Proportional to the number of devices forming a network |
| Number of used protocol types | Proportional to a trend in device usage |
| Variation in TTL attributes of IP headers | Corresponding to the distance between terminals forming a network |

The traffic volume corresponds to the number of communication packets transmitted or received per unit time. A device can receive unicast communication addressed to that device and broadcast communication and multicast communication not specifying a destination when connecting to a network. The traffic volume of broadcast and multicast increases in proportion to the number of information devices present inside the network and thus is information that can be used for estimating the scale of a connected network. To more distinctly identify the scale of the network, unicast communication may be excluded. In accordance with the value of the traffic volume, it is possible to estimate which likelihood of the usage environment being a large-scale network (an internal LAN, an isolated network), a middle-scale network, namely, a public space, or a small-scale network, namely, home is relatively higher. For example, when the value of the traffic volume is large, the usage environment is likely to be a large-scale network where the number of information devices present inside the network is large. Further, when the value of the traffic volume is small, the likelihood of the usage environment being a small-scale network, namely, a home is high, and when the value of the traffic volume is medium, the likelihood of the usage environment being a middle-scale network, namely, a public space is high.

The number of destination addresses corresponds to the variation quantity of addresses destined by communication packets transmitted or received per unit time. If devices use various external services, the number of destination addresses will be large. If the number of destination addresses is extremely small, the likelihood of the network environment being an isolated network with restricted communication is relatively high.

The number of sender addresses corresponds to the variation quantity of addresses sourced by communication packets transmitted or received per unit time. If a large number of information devices are present in a network, the number of sender addresses will be large. The number of sender addresses in accordance with the usage environment has a similar trend to a traffic volume. Since the number of sender addresses is data that essentially differs from a traffic volume, however, it is possible to increase the accuracy in estimating the usage environment by observing the trend in combination with the traffic volume.

The number of protocol types corresponds to the variation quantity of protocols used by transmitted or received communication packets per unit time. If the number of information devices connected to a network is large, the number of protocol types will be large in proportion thereto. Further, in a network environment with a strong restriction on functions, the number of protocol types will be small. If the number of protocol types is small, the likelihood of the usage environment being an isolated network or a public space is high.

The variation in Time to Live (TTL) attributes of IP headers corresponds to the variation quantity of TTL values associated with communication packets transmitted or received per unit time. The TTL value is a value that is decremented each time a packet passes via a router and thus will be a smaller value for such a packet that reaches its destination via more routers. An environment having only large TTL values as a whole and having little variation in TTL attributes is likely to be a small-scale network. An environment having TTL values from a large value to a small value and having much variation in TTL attributes is likely to be a large-scale network.

As discussed above, although respective parameters have some degrees of trend for features such as a network scale, it is difficult to logically determine a threshold used for determining the trend. Further, it is preferable to estimate the usage environment by using a plurality of parameters in combination for multiple determination. In view of the above, in the present embodiment, a learning algorithm is used to perform the estimation process with reference to a combination of a usage environment and communication logs acquired therein. Since it is also possible to determine the threshold by performing many times of experiments without using a learning algorithm, the present technique is a technique that is applicable to even a scheme based on such a threshold when no learning algorithm is used.

Communication logs (feature information on communication) used as input are numerically vectorized by through modification applied to each information (data) obtained from transmitted or received communication packets to improve the accuracy in estimation. For variation in traffic volumes and TTL attributes, a histogram is created from quantities on a unit time basis by using information as learning data in advance, and a threshold for dividing the histogram into five ranges is determined so as to include the same amount of data in each range, for example. Based on the determined threshold, the variation in traffic volumes and TTL attributes per unit time is replaced with any of integer values from 1 to 5 that are values of corresponding ranges, and the replaced integer value is used as input. Note that, although an example of dividing the histogram into five ranges is illustrated, the number of divided ranges may be any number and can be set as appropriate in accordance with a value range of other parameters or the like, for example.

Further, for the number of destination addresses, the number of sender addresses, and the number of protocol types, the occurrence variation in unique values is used after those destination addresses, sender addresses, and protocol types that have occurred only few times such as once or twice within a unit time are excluded. This makes it possible to observe the trend of communication after excluding less frequently occurring communication. For example, for the number of destination addresses and the number of sender addresses, packets having the same duplicated value included in transmitted or received packets within a unit time are counted, respectively. Corresponding packets are then selected from packets having a value with the highest number of duplication times in descending order, and when the remaining packets are 1% of all the packets, the number of values selected so far is used. In such a way, for both of the destination addresses and the sender addresses of the packets transmitted or received within a unit time, the number of addresses resulted when the extracted packets have reached top 99% by occupancy rate is used. Similarly, for the number of protocol types, packets using the same duplicated protocol included in transmitted or received packets within a unit time are counted. Corresponding packets are then selected from packets having a protocol with the highest number of duplication times in descending order, and when the remaining packets are 1% of all the packets, the number of protocol types selected so far is used. In such a way, from protocol types used in packets transmitted or received within a unit time, the number of protocol types resulted when the extracted packets have reached top 99% by occupancy rate is used. Such a value is used because the value is included within a range of approximately 1 to 20, though depending on how to define the unit time. If a value that is much larger than 20 occurs, a process to round the value to 20 or the like may be employed.

When collecting the number of destination addresses, the number of sender addresses, and the number of protocol types, it is preferable to include each breakdown information. This is because extraction of top 90% enables more accurate analysis or the like rather than extraction of top 99% in terms of tuning in learning. The breakdown may be information on the number of respective packets. For example, in a case of address information, the number of packets of 192.168.100.12 is 80, and the number of packets of 172.24.100.30 is 32. Furthermore, since IP addresses may be handled as personal information, it is preferable to take a form of collecting address information in a confidential manner, such as defining 192.168.100.12 as address A and defining 172.24.100.30 as address B.

In general, when values of parameters having significantly different value ranges are directly input to a learning algorithm, the difference in the value range may affect the estimation accuracy. For example, when only traffic volumes have a value range from 1 to 10000 and other parameters have a value range from 1 to 10, the estimation result will strongly react with the traffic volume. Such a difference in the numerically vectorized value range is reduced for well-balanced use of respective parameters, and thereby the estimation accuracy can be improved.

It is possible to generate the learning model (trained model) 701 by collecting a large number of samples for combinations of the communication log 702, which is input, and the usage environment 703, which corresponds to output in an actual environment, and performing training based on the collected samples. In the present embodiment, a parameter array per unit time related to the communication log 702 is used to form a one-dimensional array, and the one-dimensional array is sampled for multiple times and arranged in time series to form a two-dimensional array. A trained model is generated by using information on this two-dimensional array and a setting value for a usage environment and using a general algorithm used for generating a Convolutional Neural network (CNN) model. Note that a classifier may be configured by using an algorithm such as a k-nearest neighbor or a support vector machine.

Figure 8A:
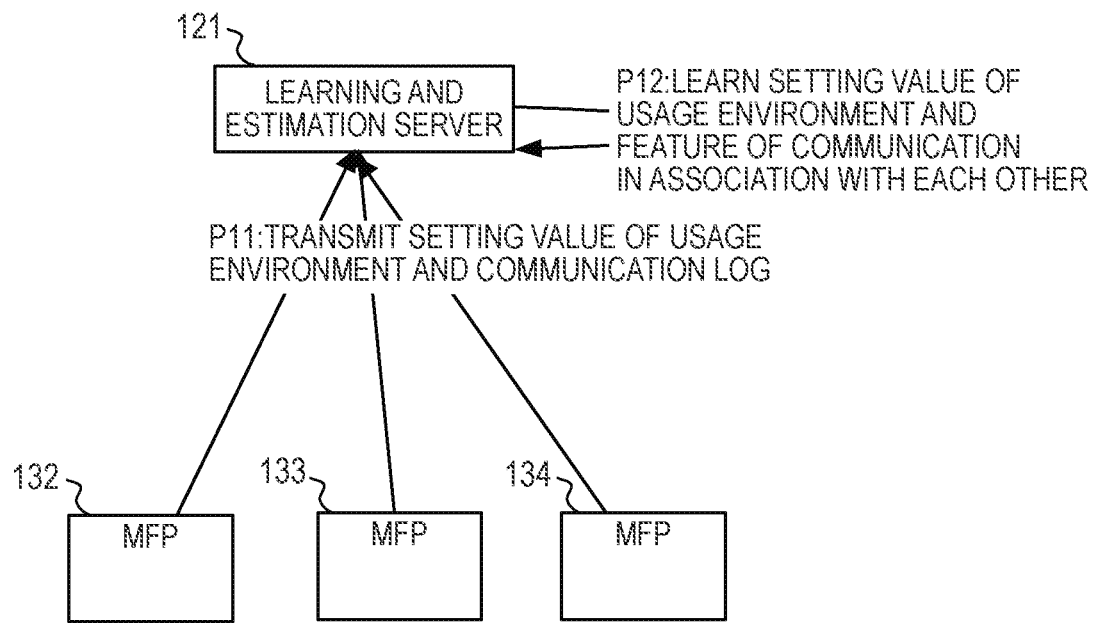
FIG. 8A is a diagram illustrating an operation of a system using the learning model.

The operation of a system using the structure of the learning model illustrated in FIG. 7 will be described with reference to FIG. 8A and FIG. 8B. FIG. 8A is a diagram illustrating the operation of the system in a learning phase. The MFPs 132, 133, 134 each periodically transmit a setting value of the usage environment listed in Table 1, which has been set for the device by using the recommended security setting window 601, and a communication log including the information listed in Table 2, which has been extracted by the communication log extraction unit 411, to the learning and estimation server 121 (P11). Although only three MFPs are described for the purpose of illustration in the present embodiment, data (setting values of usage environments and communication logs) of a large number (for example, several millions) of other operated devices are collected in the actual system. The combinations of the setting values of usage environments and communication logs obtained in such a way are numerically vectorized as illustrated with FIG. 7, and a trained model is generated through calculation using a machine learning algorithm. Learning is performed on the setting values of usage environments and features of communication in association with each other in such a way, and thereby a trained model is generated (P12). Since a bias occurs in data obtained for each usage environment in the actual system, data modification such as to adjust the number of samples of data for avoiding over-learning for a particular usage environment or to remove data determined as an outlier based on the standard deviation for each usage environment is performed.

Figure 8B:
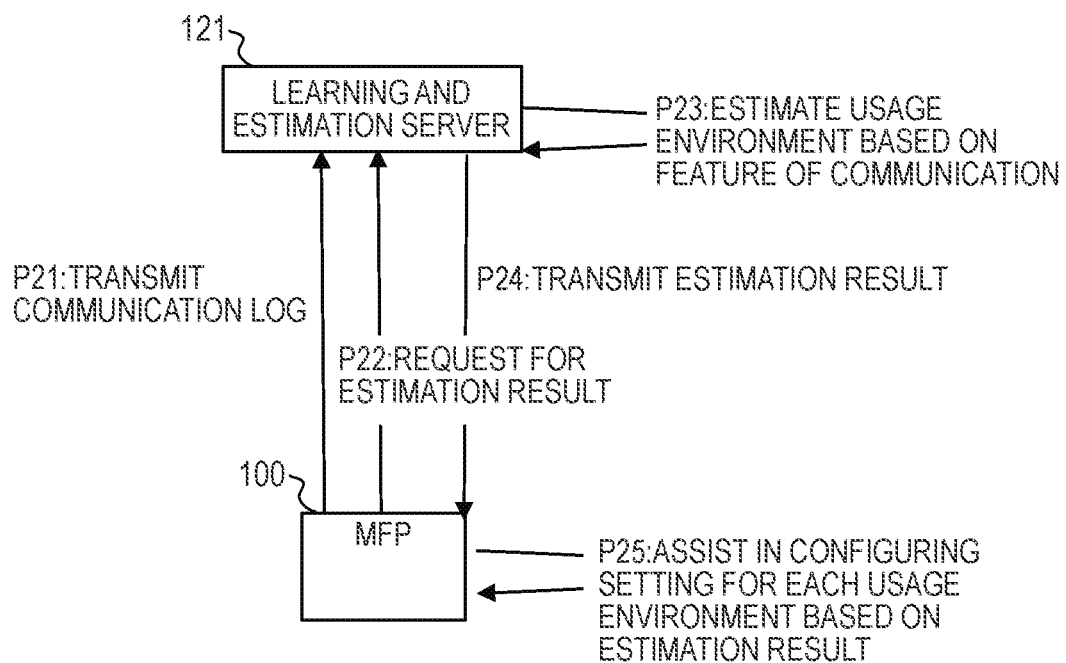
FIG. 8B is a diagram illustrating an operation of a system using the learning model.

FIG. 8B is a diagram illustrating the operation of the system in an estimation phase. The MFP 100 has completed connection to a network and started communication for implementing the operation as an MFP. The MFP 100 transmits a communication log to the learning and estimation server 121 (P21). For example, the MFP 100 transmits communication logs including the extracted feature information listed in Table 2 to the learning and estimation server 121 at a timing that communication logs have been collected for 30 seconds by the communication log extraction unit 411, for example. Such transmission of communication logs to the learning and estimation server 121 may be triggered by a condition that a certain volume of communication such as 100 packets, for example, has been collected, may be performed sequentially, or may be triggered by a condition that some user operation is made.

The MFP 100 then transmits a request for an estimation result to the learning and estimation server 121 (P22). For example, the MFP 100 requests an estimation result from the learning and estimation server 121 in response to start of a particular window display or the like.

The learning and estimation server 121 estimates the usage environment of the MFP 100 based on the feature of the communication at the MFP 100 (P23). In response to receiving the request for an estimation result from the MFP 100, the learning and estimation server 121 inputs communication logs received from the MFP 100 so far to the generated trained model in the learning phase to acquire a usage environment as output.

The learning and estimation server 121 transmits the usage environment of the MFP 100 obtained as the output of the trained model to the MFP 100 as the estimation result (P24).

The MFP 100 assists the user in configuring a setting for each usage environment based on the estimation result from the learning and estimation server 121 (P25). Based on the usage environment estimated by the learning and estimation server 121, the MFP 100 determines information to be displayed in the usage environment estimation result display part 607 or in the information display part 608, such as a comparison result between a usage environment being selected and the estimated usage environment, as illustrated in FIG. 6A and FIG. 6B.

Once a series of operations described above are performed, machine learning can be performed based on setting values of usage environments and communication logs of other MFPs not used by the user of interest, and a setting value of a usage environment that is likely to be appropriate to set can be presented based on communication logs of the MFP used by the user. This can prevent the user from giving up configuring the setting because of difficulty in determining a usage environment before selection or from using the MFP configured with a setting for a wrong usage environment.

Figure 9:
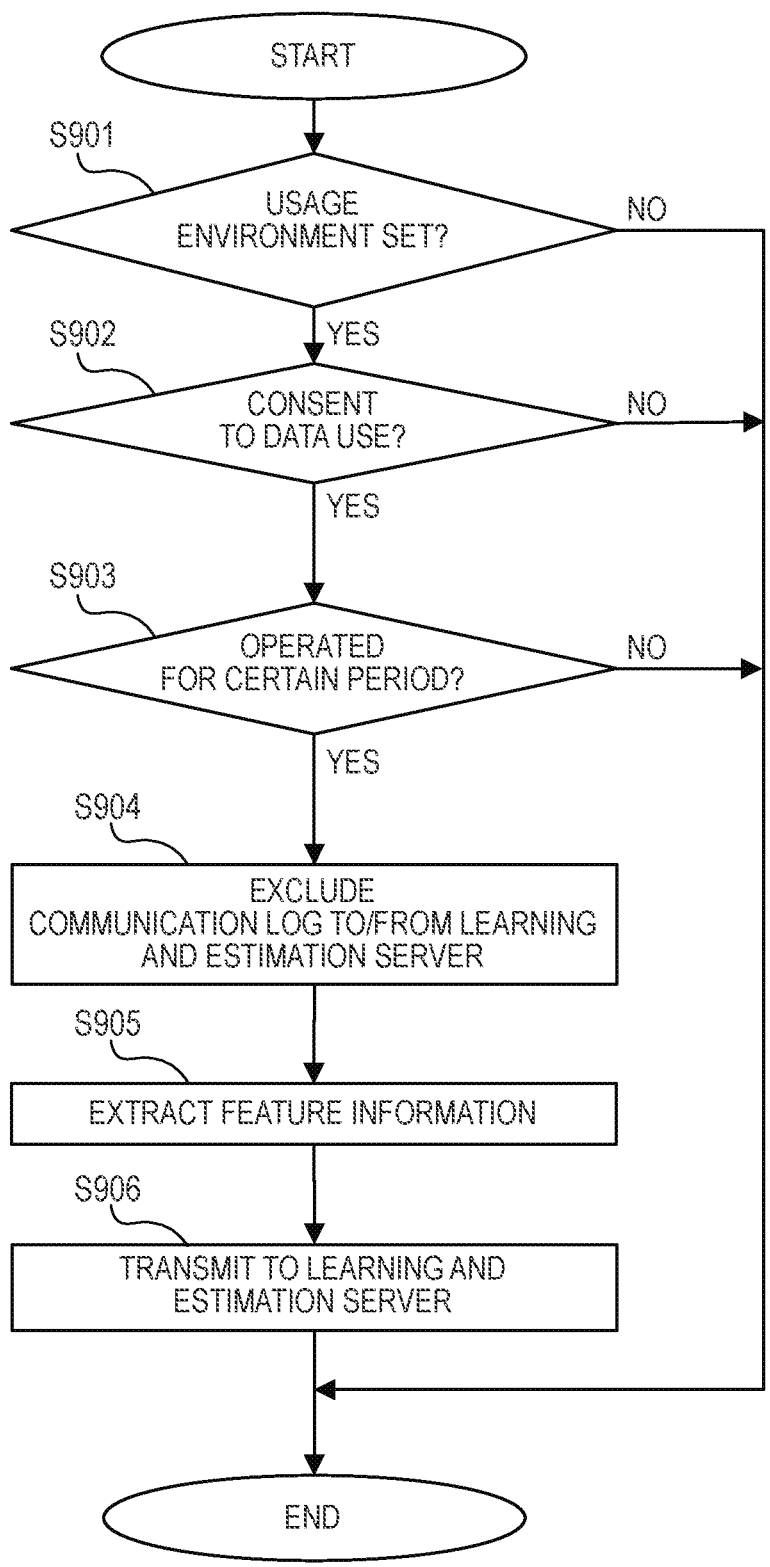
FIG. 9 is a flowchart illustrating an example of a data transmission process of the MFP.

A process in which the MFPs 132, 133, 134 notify the learning and estimation server 121 of communication logs in the learning phase as with process P11 of FIG. 8A will be described with reference to FIG. 9. FIG. 9 is a flowchart illustrating an example of a data transmission process performed by the MFPs 132, 133, 134. The process of the flowchart of FIG. 9 is implemented when the CPU 201 loads a program stored in the flash ROM 211 into the DRAM 202 and then executes the program. The process of the flowchart of FIG. 9 is started every time some communication is performed.

In step S901, the communication log extraction unit 411 determines whether or not a usage environment has been set. The communication log extraction unit 411 confirms that information indicating the usage environment set by using the recommended security setting window 601 is stored in the data storage unit 402 and thereby determines whether or not a usage environment has been set. If it is determined that a usage environment has been set (step S901, YES), the process proceeds to step S902, and if it is determined that no usage environment has been set (step S901, NO), the process of the flowchart of FIG. 9 ends.

In step S902, the communication log extraction unit 411 determines whether or not there is user consent for data use. At the MFPs 132, 133, 134, popup display or the like may be performed on the operating unit 102 at a timing such as at initial startup or at setting of network connection to ask the MFP user whether or not data use is acceptable. A result indicating that the user consents to or refuses data use is stored in the data storage unit 402. In the process of step S902, the communication log extraction unit 411 determines whether or not the user consents to data use by checking the information as to whether the user consents to or refuses data use stored in the data storage unit 402. If it is determined that the user consents to data use (step S902, YES), the process proceeds to step S903, and if it is determined that the user does not consent to data use (step S902, NO), the process of the flowchart of FIG. 9 ends.

In step S903, the communication log extraction unit 411 determines whether or not each of the MFPs 132, 133, 134 has been operated for a certain period. The communication log extraction unit 411 checks the data storage unit 402, checks the date and time when the usage environment was set by using the recommended security setting window 601, and thereby determines whether or not each MFP has been operated for a certain period. For example, if a predetermined threshold such as one week from setting of a usage environment is exceeded, the communication log extraction unit 411 considers that the MFP has been operated for a certain period. If it is determined that the MFP has been operated for a certain period (step S903, YES), the process proceeds to step S904, and if it is determined that the MFP has not been operated for a certain period (step S903, NO), the process of the flowchart of FIG. 9 ends. Because information generated from a device that has not been operated for a certain period is not transmitted in such a way, data on which setting may be changed immediately afterwards can be excluded from the learning data, and the estimation accuracy is expected to be improved. Note that, although the process is branched by the condition of a time such as a certain period in the present embodiment, the process may be branched by a condition related to an excess above a certain volume of communication, a certain number of times of print job reception, or some user operation.

In step S904, the communication log extraction unit 411 excludes communication logs related to the communication with the learning and estimation server 121 from overall communication logs. When the IP address or uniform resource locator (URL) of a communicating entity is allocated to the learning and estimation server 121, the communication log extraction unit 411 deletes the communication log thereof. The communication with the learning and estimation server 121 is always performed by a device that collects information for learning in the present embodiment and thus not changed by a usage environment for each device. Because such communication which does not vary regardless of a usage environment is excluded, trend learning can be performed by focusing on a portion which varies for each usage environment, and the estimation accuracy is expected to be improved.

In step S905, the communication log extraction unit 411 extracts feature information. The communication log extraction unit 411 extracts feature information by performing a process to extract the information listed in Table 2 from transmitted or received communication packet data. Since the unit of information is an aggregated value per predetermined unit time such as 30 seconds, for example, a process to collect packets for a certain period is performed in this step. Although time is used as a collection unit in the present embodiment, the amount of data such as 100 packets may be used as a collection unit, for example.

In step S906, the communication log extraction unit 411 transmits the communication logs made up of the feature information extracted in step S905 to the learning and estimation server 121. The communication log extraction unit 411 requests the learning and estimation server communication unit 410 to transmit the communication logs to the learning and estimation server 121 via the network control unit 407. At this time, the setting value of the usage environment stored in the data storage unit 402 is transmitted to the learning and estimation server 121 together with the communication logs.

As described above, by performing the process of the flowchart of FIG. 9, it is possible to collect setting values of usage environments and communication logs from a large number of MFPs used in various locations.

Figure 10:
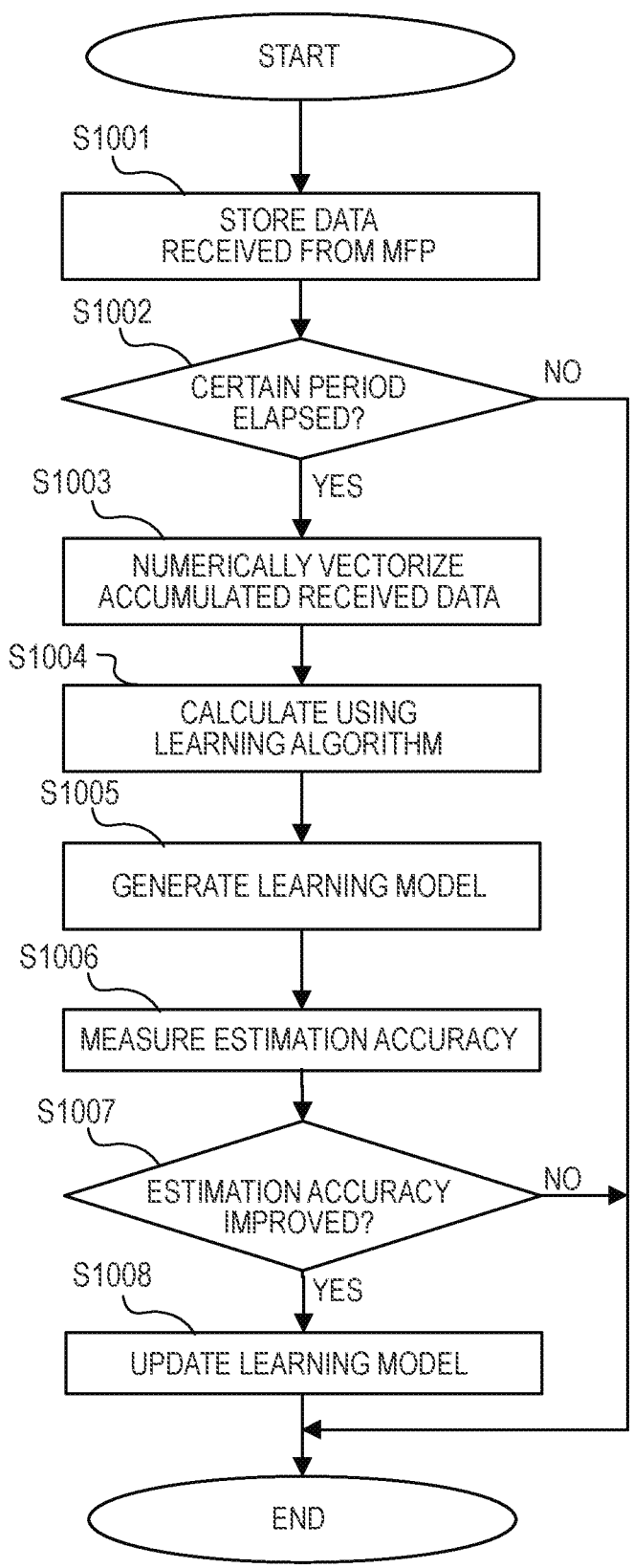
FIG. 10 is a flowchart illustrating an example of a generation and update process of a trained model performed by the learning and estimation server.

A process in which the learning and estimation server 121 receives feature information on communication as training data (communication log) and setting information on a usage environment (setting value) and generates and updates a trained model will be described with reference to FIG. 10. FIG. 10 is a flowchart illustrating an example of a generation and update process of the trained model performed by the learning and estimation server 121. The process of the flowchart of FIG. 10 is implemented when the CPU 301 loads a program stored in the storage device 305 into the DRAM 302 and then executes the program. The process of the flowchart of FIG. 10 is started in response to receiving a communication log from the MFP 132, 133, 134.

In step S1001, the learning and estimation server 121 stores data (communication logs and setting values of usage environments) received from the MFP. This process of step S1001 is a process to receive data transmitted by the MFP in step S905 of FIG. 9 and store the received data in the data storage unit 502. Herein, when the usage environment of the MFP is an isolated network described with Table 1, since the Internet is not available in collecting data, data can be collected as follows, for example. For example, Virtual Private Network (VPN) connection is established between a network to which the MFP is connected and the learning and estimation server 121, and data is collected through the established communicative connection without being routed via the Internet. Further, a service engineer may duplicate communication logs accumulated in the MFP to a portable storage medium or the like when visiting the user and then transmit the data to the learning and estimation server 121 from a terminal or the like located at a service location.

In step S1002, the learning and estimation server 121 determines whether or not a certain period has elapsed from a predetermined reference time. For example, when updating a learning model in a predetermined cycle such as once a week, the learning and estimation server 121 determines whether or not the data collection from the MFP has been performed for one week. If it is determined that the certain period has elapsed (step S1002, YES), the process proceeds to step S1003, and if it is determined that the certain period has not yet elapsed (step S1002, NO), the process of the flowchart of FIG. 10 ends. Note that, although a time such as a certain time is used as a condition in the present embodiment, an amount of data such as the data quantity of received communication logs reaching a predetermined value may be used as a condition.

In step S1003, the learning and estimation server 121 numerically vectorizes accumulated received data. The learning and estimation server 121 performs a numerically vectorizing process on communication logs corresponding to the input described as the illustration of FIG. 7 to convert the information on the received communication logs into array data of integers having the same value range. This communication logs corresponding to one-dimensional array data are arranged in time series for each individual MFP to obtain a two-dimensional array data. This two-dimensional array data is used as input data, and the setting value of the usage environment set for the MFP corresponding to the two-dimensional array data is used as training data to form one learning data. The same process is performed on the received data on all the MFPs to obtain a learning data set made up of multiple learning data.

In step S1004, the learning and estimation server 121 uses a learning algorithm to perform calculation. The learning and estimation server 121 uses Convolutional Neural network (CNN) to calculate the learning data set generated in step S1003.

In step S1005, the learning and estimation server 121 generates a trained model based on the calculation result in step S1004. The learning and estimation server 121 extracts the result calculated in step S1004 and stores the trained model data as a trained model candidate in the data storage unit 502.

In step S1006, the learning and estimation server 121 measures the estimation accuracy of the trained model stored as the trained model candidate in step S1005. The learning and estimation server 121 uses collected data on the MFP to inspect the accuracy of the trained model stored as the trained model candidate in step S1005. In the inspection, the learning and estimation server 121 uses data in the inspection, which has not been used for learning, as with a hold-out method or the like, for example, to measure the estimation accuracy and stores the obtained accuracy information in the data storage unit 502.

In step S1007, the learning and estimation server 121 determines whether or not the estimation accuracy of the trained model has improved. The learning and estimation server 121 determines whether or not the estimation accuracy, which is currently measured in step S1006, of the trained model stored as the trained model candidate in step S1005 has improved from the estimation accuracy of the trained model that has been stored on or before the previous process. If it is determined that the estimation accuracy has improved (step S1007, YES), the process proceeds to step S1008, and if it is determined that the estimation accuracy has not improved (step S1007, NO), the process of the flowchart of FIG. 10 ends. Note that, although the process of the program applies uniform determination for all the usage environments in the present embodiment, it may sometimes be difficult to systematically determine which performance is generally better, because, for example, the accuracy of a particular usage environment may increase while the accuracy of another usage environment may decrease in the actual implementation. To take such a case into consideration, confirmation of accuracy may be performed each time by a person from a result of comparison and evaluation, and the learning and estimation server 121 may be instructed by the person based on the determination.

In step S1008, the learning and estimation server 121 updates the trained model. The learning and estimation server 121 overwrites and updates the trained model stored in the data storage unit 502 with the trained model stored as the trained model candidate in step S1005.

As described above, by performing the process of the flowchart of FIG. 10, the learning and estimation server 121 can generate a trained model used for the usage environment estimation process based on learning data that is based on collected communication logs and collected setting values of usage environments of the MFPs.

A process in which the MFP 100 notifies the learning and estimation server 121 of communication logs in the estimation phase as with the process P21 of FIG. 8B will be described with reference to FIG. 11. FIG. 11 is a flowchart illustrating an example of a data transmission process performed by the MFP 100. The process of the flowchart of FIG. 11 is implemented when the CPU 201 loads a program stored in the flash ROM 211 into the DRAM 202 and then executes the program. The process of the flowchart of FIG. 11 is started every time some communication is performed.

In step S1101, the communication log extraction unit 411 excludes communication logs related to the communication with the learning and estimation server 121 from overall communication logs. When the IP address or URL of a communicating entity is allocated to the learning and estimation server 121, the communication log extraction unit 411 deletes the communication log thereof. Since no communication log related to the communication with the learning and estimation server 121 is used in the learning phase, communication logs related to the communication with the learning and estimation server 121 are also excluded in the estimation phase, and thereby higher estimation accuracy is expected.

In step S1102, the communication log extraction unit 411 extracts feature information. The communication log extraction unit 411 extracts feature information by performing a process to extract the information listed in Table 2 from the transmitted or received communication packet data.

In step S1103, the communication log extraction unit 411 transmits the communication logs made up of the feature information extracted in step S1102 to the learning and estimation server 121. The communication log extraction unit 411 requests the learning and estimation server communication unit 410 to transmit the communication logs to the learning and estimation server 121 via the network control unit 407.

As described above, by performing the process of the flowchart of FIG. 11, it is possible to prepare communication logs used as the input in the usage environment estimation process of the MFP 100.

Figure 12A:
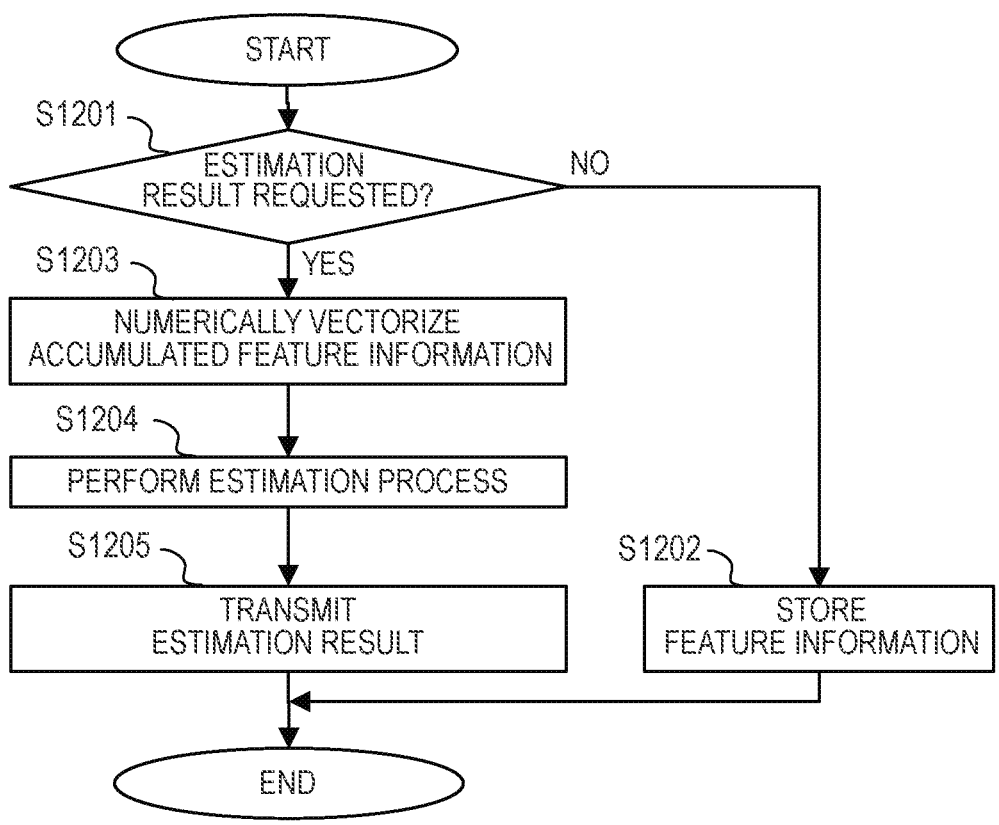
FIG. 12A is a flowchart illustrating an example of a process in an estimation phase in a first embodiment.

A process when the learning and estimation server 121 receives a request for an estimation result or communication logs and a process in which the MFP 100 acquires a usage environment estimation result in the estimation phase will be described with reference to FIG. 12A and FIG. 12B. FIG. 12A is a flowchart illustrating an example of the process performed by the learning and estimation server 121. The process of the flowchart of FIG. 12A is implemented when the CPU 301 loads a program stored in the storage device 305 into the DRAM 302 and then executes the program. The process of the flowchart of FIG. 12A is started in response to receiving a communication log or a request for an estimation result from the MFP 100.

In step S1201, the learning and estimation server 121 determines whether or not data received from the MFP 100 is a request for an estimation result. Specifically, the learning and estimation server 121 determines whether the data received from the MFP is a request for an estimation result or is a communication log (feature information). If it is determined that the received data is a request for an estimation result (step S1201, YES), the process proceeds to step S1203, and if it is determined that the received data is not a request for an estimation result but a communication log (step S1203, NO), the process proceeds to step S1202.

In step S1202 to which the process proceeds if it is determined that a communication log is received, the learning and estimation server 121 stores the feature information (communication log) received from the MFP 100. Although the learning and estimation server 121 stores the communication log currently transmitted by the MFP 100 in the data storage unit 502, a communication log received in the past has already been stored. Thus, the learning and estimation server 121 does not overwrite the past communication log and stores the current communication log by adding the same together with a reception time. In response to completion of the process of step S1202, the process of the flowchart of FIG. 12A ends.

In step S1203 to which the process proceeds if it is determined that a request for an estimation result is received, the learning and estimation server 121 numerically vectorizes accumulated feature information (communication logs). The learning and estimation server 121 numerically vectorizes communication logs associated with the MFP 100 that have been received so far and stored in the data storage unit 502. The process of numerical vectorization is a numerical vectorization process described as the illustration of FIG. 7 and is to perform the same process as that performed in the learning phase.

In step S1204, the learning and estimation server 121 performs an estimation process for the usage environment of the MFP 100. The learning and estimation server 121 uses the trained model stored in the data storage unit 502 in step S1008 of FIG. 10 to input the numerically vectorized communication logs created in step S1203 to the trained model as input data and obtain a usage environment estimation result as the output.

In step S1205, the learning and estimation server 121 transmits the usage environment estimation result acquired in step S1204 to the MFP 100. In response to completion of the process of step S1205, the process of the flowchart of FIG. 12A ends.

Figure 12B:
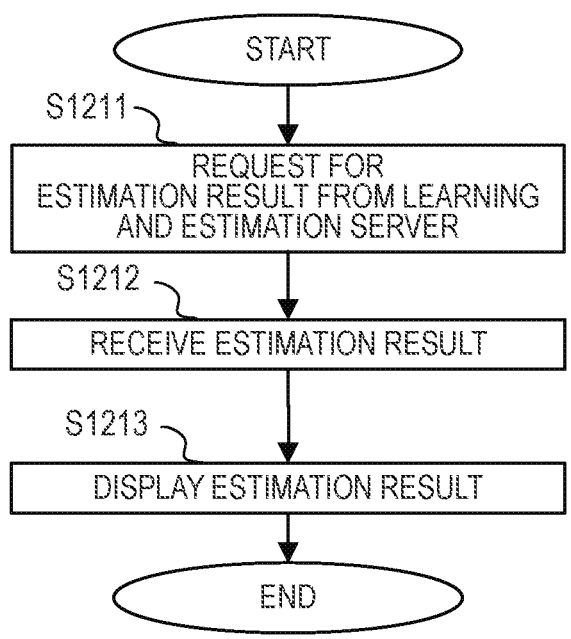
FIG. 12B is a flowchart illustrating an example of a process in the estimation phase in the first embodiment.

FIG. 12B is a flowchart illustrating an example of the process in which the MFP 100 acquires a usage environment estimation result. The process of the flowchart of FIG. 12B is implemented when the CPU 201 loads a program stored in the flash ROM 211 into the DRAM 202 and then executes the program. For example, the process of the flowchart of FIG. 12B is started when display of the recommended security setting window 601 illustrated in FIG. 6A or FIG. 6B is started. Further, for example, the process of the flowchart of FIG. 12B may be started at a periodical timing such as once a day.

In step S1211, the MFP 100 transmits the request for a usage environment estimation result to the learning and estimation server 121.

In step S1212, the MFP 100 receives the usage environment estimation result transmitted from the learning and estimation server 121 as a response to the request for an estimation result. The usage environment estimation result to be received is the result determined by the estimation process performed in step S1204 of FIG. 12A and transmitted from the learning and estimation server 121 in step S1205 of FIG. 12A.

In step S1213, the MFP 100 displays the usage environment estimation result. For example, when having acquired the usage environment estimation result in response to start of display of the recommended security setting window 601, the MFP 100 displays the acquired estimation result on the usage environment estimation result display part 607. Further, for example, when having acquired the estimation result at a periodical timing such as once a day, the MFP 100 displays a suitable message in the information display part 608 by taking comparison with the current setting value into consideration. Note that, when no setting has been configured via the recommended security setting window 601, display to suggest the user to use the recommended security setting window 601 for settings may be provided.

By performing the process as described above, the MFP 100 can acquire and present a usage environment estimation result to the user, which can assist the user in configuring an appropriate setting of the usage environment.

According to the first embodiment, even when the user does not have expert knowledge about security, it is possible to select a usage environment that is likely to be appropriate as the usage environment to configure an appropriate setting related to security based on a setting trend in a large number of MFPs used by other users. Further, for example, even when the usage environment recognized by the user differs from the usage environment recognized by the majority of other users, it is possible to present a usage environment that is likely to be appropriate and prevent a setting related to an inappropriate security. Further, for example, when a setting related to security that has been appropriate becomes inappropriate due to a change in the usage environment, it is possible to present a usage environment that is currently likely to be appropriate and change the setting related to security to an appropriate setting.

Second Embodiment

Although the learning and estimation server 121 performs a usage environment estimation process in the first embodiment, an example in which a usage environment estimation process is performed on the side of an information device, which is an edge device, instead of the learning and estimation server 121 will be described in the second embodiment. Details of the system configuration through the method of generating a trained model are the same as those in the first embodiment described with reference to FIG. 1 to FIG. 10. In the second embodiment, the trained model stored in the data storage unit 502 of the learning and estimation server 121 in step S1008 of FIG. 10 is arranged in the data storage unit 402 of the MFP 100 in advance. While this is arranged before shipment of the device, a mechanism for upgrading the firmware version may be provided and then updated at the same timing as an update of another program. Further, a mechanism to separately update only the trained model may be provided.

Figure 13A:
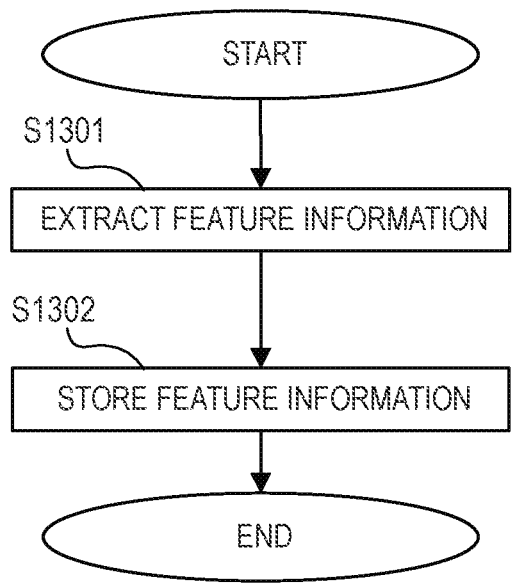
FIG. 13A is a flowchart illustrating an example of a process in an estimation phase in a second embodiment.

A process in an estimation phase in the second embodiment will be described with reference to FIG. 13A and FIG. 13B. FIG. 13A is a flowchart illustrating an example of a data collection process performed by the MFP 100 in the estimation phase. The process of the flowchart of FIG. 13A is implemented when the CPU 201 loads a program stored in the flash ROM 211 into the DRAM 202 and then executes the program. The process of the flowchart of FIG. 13A is started every time some communication is performed.

In step S1301, the communication log extraction unit 411 extracts feature information. The communication log extraction unit 411 extracts feature information by performing a process to extract the information listed in Table 2 from transmitted or received communication packet data.

In step S1302, the communication log extraction unit 411 stores the feature information extracted in step S1302 in the data storage unit 402.

By performing the process as described above, the MFP 100 can periodically acquire communication logs used as input data in the usage environment estimation process.

Figure 13B:
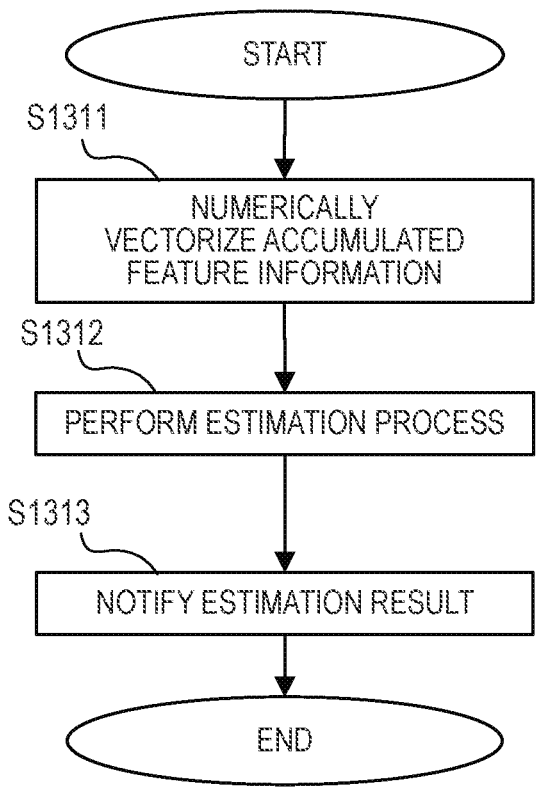
FIG. 13B is a flowchart illustrating an example of a process in the estimation phase in the second embodiment.

FIG. 13B is a flowchart illustrating an example of an estimation process performed by the MFP 100 in the estimation phase. The process of the flowchart of FIG. 13B is implemented when the CPU 201 loads a program stored in the flash ROM 211 into the DRAM 202 and then executes the program. For example, the process of the flowchart of FIG. 13B is started when display of the recommended security setting window 601 illustrated in FIG. 6A or FIG. 6B is started. Further, for example, the process of the flowchart of FIG. 13B may be started at a periodical timing such as once a day.

In step S1311, the estimation processing unit 412 numerically vectorizes accumulated feature information (communication logs). The estimation processing unit 412 modifies the data of the communication logs stored in the data storage unit 402 in step S1302 by the method described as the illustration of FIG. 7 and converts the data into an array structure handled as input by the trained model.

In step S1312, the estimation processing unit 412 performs the usage environment estimation process. The estimation processing unit 412 uses the trained model stored in the data storage unit 402 after generated in the process illustrated in FIG. 10 to input the numerically vectorized communication logs created in step S1311 to the trained model as input data and obtain a usage environment estimation result as the output.

In step S1313, the estimation processing unit 412 displays the usage environment estimation result. For example, when having acquired the usage environment estimation result in response to start of display of the recommended security setting window 601, the estimation processing unit 412 displays the acquired estimation result on the usage environment estimation result display part 607. Further, for example, when having acquired the estimation result at a periodical timing such as once a day, the estimation processing unit 412 displays a suitable message in the information display part 608 by taking comparison with the current setting value into consideration.

By performing the process as described above, it is possible to acquire and present a usage environment estimation result to the user even in an environment in which the MFP is not always in connection with the learning and estimation server, and this improves convenience. The user may select a usage environment that is likely to be appropriate as the usage environment based on the presented estimation result and configure an appropriate setting related to security.

Note that, in the first embodiment and the second embodiment described above, selection of a usage environment that is likely to be appropriate is determined by using a single trained model. Without being limited thereto, a trained model that outputs a compatibility thereof for each pattern of usage environments may be prepared, determination may be made based on the output compatibility, and a pattern of a usage environment having the highest compatibility may be selected as a usage environment that is likely to be appropriate. For example, when there are four patterns of usage environments, four trained models corresponding to respective patterns are used to acquire compatibilities for respective patterns, and a pattern having the highest compatibility out of the four patterns can be selected as the usage environment.

Further, although MFPs are described as an example in the first embodiment and the second embodiment described above, the present invention is not limited to application to MFPs and is applicable to information processing apparatuses in general.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to present an estimated usage environment of a device and assist the user in configuring an appropriate setting related to a security measure.

This application claims the benefit of Japanese Patent Application No. 2022-016554 filed on Feb. 4, 2022, which is hereby incorporated by reference herein in its entirety.

What is claimed is:

1. An information processing apparatus comprising:
an acquisition unit that acquires feature information on communication performed by the information processing apparatus;
an estimation unit that estimates a usage environment of the information processing apparatus based on a trained model and on the acquired feature information on the communication related to the information processing apparatus, the trained model being generated through machine learning performed based on feature information on communication performed by a plurality of devices, which differ from the information processing apparatus, and setting information on usage environments set for the plurality of devices; and
a notification unit that notifies the estimated usage environment of the information processing apparatus.

2. The information processing apparatus according to claim 1, wherein the feature information on the communication is information extracted from communication packets transmitted or received by the devices.

3. The information processing apparatus according to claim 1, wherein the feature information on the communication includes at least one of an index related to the number of communication packets transmitted or received by a device, an index related to an address included in the communication packets, an index related to a protocol used for the communication packets, and an index related to header information on the communication packets.

4. The information processing apparatus according to claim 1, wherein the estimation unit numerically vectorizes the feature information on the communication related to the information processing apparatus and estimates a usage environment of the information processing apparatus based on the numerically vectorized feature information.

5. The information processing apparatus according to claim 1, wherein the trained model is generated through machine learning performed based on the feature information on the communication related to the plurality of devices operated for a predetermined period and the setting information on the usage environments set for the plurality of devices.

6. The information processing apparatus according to claim 1, wherein the trained model is generated through machine learning performed by using, as input data, the feature information on the communication related to the plurality of devices and using, as training data, the setting information on the usage environments set for the plurality of devices.

7. The information processing apparatus according to claim 1 further comprising a display unit that displays the estimated usage environment of the information processing apparatus.

8. The information processing apparatus according to claim 1 further comprising a setting unit that, based on a usage environment set by a user, configures a security setting in accordance with the usage environment.

9. An information processing apparatus comprising:
an acquisition unit that acquires feature information on communication performed by a plurality of devices and setting information on usage environments set for the devices; and
a learning unit that performs machine learning based on the acquired feature information on the communication and the setting information on the usage environments and generates a trained model used for an estimation process for a usage environment.

10. The information processing apparatus according to claim 9, wherein the feature information on the communication includes at least one piece of information of an index related to the number of communication packets transmitted or received by a device, an index related to an address included in the communication packets, an index related to a protocol used for the communication packets, and an index related to header information on the communication packets.

11. The information processing apparatus according to claim 9, wherein the learning unit numerically vectorizes the feature information on the communication and generates the trained model based on the numerically vectorized feature information.

12. The information processing apparatus according to claim 9, wherein the learning unit generates the trained model based on the feature information on the communication related to the devices operated for a predetermined period and the setting information on the usage environments set for the devices.

13. The information processing apparatus according to claim 9, wherein the learning unit generates the trained model by performing machine learning by using, as input data, the feature information on the communication and using, as training data, the setting information on the usage environments.

14. A system comprising:
an acquisition unit that acquires feature information on communication performed by a first device;
an estimation unit that estimates a usage environment of the first device based on a trained model and on the acquired feature information on the communication related to the first device, the trained model being generated through machine learning performed based on feature information on communication performed by a plurality of second devices and setting information on usage environments set for the second devices;
a notification unit that notifies the first device of the estimated usage environment of the first device; and
a display unit that displays the estimated usage environment of the first device based on the notification.

15. A control method of an information processing apparatus, the control method comprising:
an acquisition step of acquiring feature information on communication performed by the information processing apparatus;
an estimation step of estimating a usage environment of the information processing apparatus based on a trained model and on the acquired feature information on the communication related to the information processing apparatus, the trained model being generated by performing machine learning based on feature information on communication performed by a plurality of devices, which differ from the information processing apparatus, and setting information on usage environments set for the plurality of devices; and
a notification step of notifying the estimated usage environment of the information processing apparatus.

16. A control method of an information processing apparatus, the control method comprising:
an acquisition step of acquiring feature information on communication performed by a plurality of devices and setting information on usage environments set for the devices; and
a learning step of performing machine learning based on the acquired feature information on the communication and the setting information on the usage environments and generating a trained model used for an estimation process for a usage environment.

17. A non-transitory computer-readable storage medium storing a program for controlling an information processing apparatus, wherein the program causes a computer to perform:
an acquisition step of acquiring feature information on communication performed by the information processing apparatus;
an estimation step of estimating a usage environment of the information processing apparatus based on a trained model and on the acquired feature information on the communication related to the information processing apparatus, the trained model being generated through machine learning based on feature information on communication performed by a plurality of devices, which differ from the information processing apparatus, and setting information on usage environments set for the plurality of devices; and
a notification step of notifying the estimated usage environment of the information processing apparatus.

18. A non-transitory computer-readable storage medium storing a program that causes a computer to perform:
an acquisition step of acquiring feature information on communication performed by a plurality of devices and setting information on usage environments set for the devices; and
a learning step of performing machine learning based on the acquired feature information on the communication and the setting information on the usage environments and generating a trained model used for an estimation process for a usage environment.

* * * * *